United States Patent
Wright et al.

(10) Patent No.: US 11,736,765 B2
(45) Date of Patent: Aug. 22, 2023

(54) METHODS AND APPARATUS TO CREDIT MEDIA SEGMENTS SHARED AMONG MULTIPLE MEDIA ASSETS

(71) Applicant: The Nielsen Company (US), LLC, New York, NY (US)

(72) Inventors: David H. Wright, Safety Harbor, FL (US); Daniel Nelson, Tampa, FL (US); Raghuram Ranganathan, Tampa, FL (US); Derrick McCulley, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/888,203

(22) Filed: May 29, 2020

(65) Prior Publication Data

US 2021/0377603 A1 Dec. 2, 2021

(51) Int. Cl.
*H04N 21/442* (2011.01)
*H04N 21/235* (2011.01)
*H04N 21/44* (2011.01)

(52) U.S. Cl.
CPC ..... *H04N 21/44204* (2013.01); *H04N 21/235* (2013.01); *H04N 21/44008* (2013.01)

(58) Field of Classification Search
CPC .......... H04N 21/44204; H04N 21/235; H04N 21/44008; H04N 21/4394; H04N 21/6582; H04N 21/2407
See application file for complete search history.

(56) References Cited

U.S. PATENT DOCUMENTS

| | | | |
|---|---|---|---|
| 4,677,466 | A | 6/1987 | Landron et al. |
| 5,481,294 | A | 1/1996 | Thomas et al. |
| 7,460,684 | B2 | 12/2008 | Srinivasan |
| 9,438,940 | B2 | 9/2016 | Nelson |
| 9,548,830 | B2 | 1/2017 | Kariyappa et al. |
| 9,668,020 | B2 | 5/2017 | Nelson et al. |

(Continued)

OTHER PUBLICATIONS

International Searching Authority, "International Search Report," mailed in connection with International Patent Application No. PCT/US2021/034309, dated Sep. 6, 2021, 3 pages.

(Continued)

*Primary Examiner* — Adil Ocak (57) ABSTRACT

Methods, apparatus, systems and articles of manufacture to credit media segments shared among multiple media assets are disclosed. Example methods disclosed herein include comparing a sequence of monitored media signatures with a library of reference signatures to determine a signature match, the monitored media signatures representative of a monitored media presentation. Disclosed example methods also include determining a duration and an offset of the signature match, the offset to represent a position of the signature match relative to a start of a reference media asset associated with the signature match. Disclosed example methods further include crediting a segment of the monitored media presentation represented by the signature match to an identifier of a class of media assets including the reference media asset in response to a determination that (i) the duration of the signature match does not exceed a first threshold and (ii) the offset does not exceed a second threshold.

17 Claims, 5 Drawing Sheets

(56) References Cited

U.S. PATENT DOCUMENTS

| | | | |
|---|---|---|---|
| 10,200,546 B2 | 2/2019 | Nelson et al. | |
| 2005/0232411 A1 | 10/2005 | Srinivasan et al. | |
| 2006/0153296 A1 | 7/2006 | Deng | |
| 2006/0184961 A1 | 8/2006 | Lee et al. | |
| 2006/0195861 A1 | 8/2006 | Lee | |
| 2007/0050832 A1* | 3/2007 | Wright | H04N 21/42203 725/115 |
| 2007/0157224 A1* | 7/2007 | Pouliot | H04H 20/14 725/22 |
| 2007/0274537 A1 | 11/2007 | Srinivasan | |
| 2008/0091288 A1 | 4/2008 | Srinivasan | |
| 2008/0276265 A1 | 11/2008 | Topchy et al. | |
| 2009/0307084 A1 | 12/2009 | Monighetti et al. | |
| 2010/0115543 A1* | 5/2010 | Falcon | H04H 60/56 725/19 |
| 2012/0304214 A1* | 11/2012 | Falcon | H04N 21/835 725/19 |
| 2013/0007790 A1* | 1/2013 | McMillan | H04H 60/43 725/14 |
| 2014/0108441 A1 | 4/2014 | Samari et al. | |
| 2015/0289013 A1 | 10/2015 | Nelson et al. | |
| 2016/0094877 A1* | 3/2016 | Heffernan | H04N 21/8352 725/19 |
| 2018/0367868 A1* | 12/2018 | Banger | H04N 21/8358 |
| 2019/0037257 A1 | 1/2019 | Nelson et al. | |
| 2019/0082219 A1 | 3/2019 | Nelson et al. | |
| 2019/0273958 A1 | 9/2019 | Srinivasan | |
| 2019/0362405 A1* | 11/2019 | Stone | G06V 20/46 |

OTHER PUBLICATIONS

International Searching Authority, "Written Opinion," mailed in connection with International Patent Application No. PCT/US2021/034309, dated Sep. 6, 2021, 3 pages.

The International Bureau of WIPO, "International Preliminary Report on Patentability," mailed in connection with International Patent Application No. PCT/US2021/034309, dated Dec. 8, 2022, 5 pages.

\* cited by examiner

METHODS AND APPARATUS TO CREDIT MEDIA SEGMENTS SHARED AMONG MULTIPLE MEDIA ASSETS

FIELD OF THE DISCLOSURE

This disclosure relates generally to media identification systems, and, more particularly, to methods and apparatus to credit media segments shared among multiple media assets.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signatures is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature, these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company (US), LLC, etc.) desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. That is, the media monitoring entities can generate reference signatures of media that is not live broadcasted. In some examples, media that is not live broadcasted includes a subscription video on demand (SVOD) asset. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and hashed signatures. Matching using signature matches of any length and/or timestamp (e.g., location within signature) can generate false positives and incorrectly credit a media exposure to media the panelist was not actually viewing. As used herein, a "false positive" refers to incorrectly crediting a media exposure to a reference media asset that was not actually being presented to the panelist. For example, each episode of a television series can include the same introduction segment including theme music, etc. As used herein, a "lead-in bumper" refers to a segment of media that is re-used in one or more media assets of a same category (e.g., television episodes of the same series, movies of the same series, etc.). Thus, each episode of the television series will have a signature segment that is the same for each episode and which represents the lead-in bumper for that television series. If an episode is not in the reference database (e.g., a new episode in the series that does not yet have corresponding reference signatures stored in the reference database), signature matching techniques may incorrectly credit a different episode based on the signature match corresponding to the lead-in bumper. To prevent incorrect matching caused by lead-in bumpers, methods, apparatus, and systems disclosed herein credit lead-in bumpers to a general identifier (e.g., a television series identifier, etc.), instead of individual episodes, thereby reducing incorrect crediting of media exposures.

Although examples disclosed herein include crediting lead-in bumpers to a general identifier, examples disclosed herein are not limited thereto. For example, other examples of shared media (e.g., title sequences and/or credit sequences of different episodes of the same series, commercial transitions that are shared among episodes of the same series, etc.) and/or any other media segments shared among multiple media assets can be credited to a general identifier.

In some examples, media monitoring entities store generated reference databases and gathered monitoring data on cloud storage services (e.g., AMAZON WEB SERVICES®, etc.). To allow the crediting of time-shifted viewing (e.g., viewing media via a digital video recorder (DVR), etc.), the stored references are retained for a period time after the initial presentation of the media.

Methods and apparatus disclosed herein enable crediting media segments shared among multiple media assets. Example techniques disclosed herein include comparing a sequence of monitored media signatures with a library of reference signatures to determine a signature match, the sequence of monitored media signatures included in monitoring data corresponding to a monitored media presentation. Disclosed example techniques also include determining a duration of the signature match and determining an offset of the signature match, the offset to represent a position of the signature match relative to a start of a reference media asset associated with the signature match. Disclosed example techniques further include crediting, in response to determining (i) the duration of the signature match does not exceed a duration threshold and (ii) the offset does not exceed an offset threshold, a segment of the monitored media presentation represented by the signature match to an identifier of a class of media assets including the reference media asset.

Figure 1:
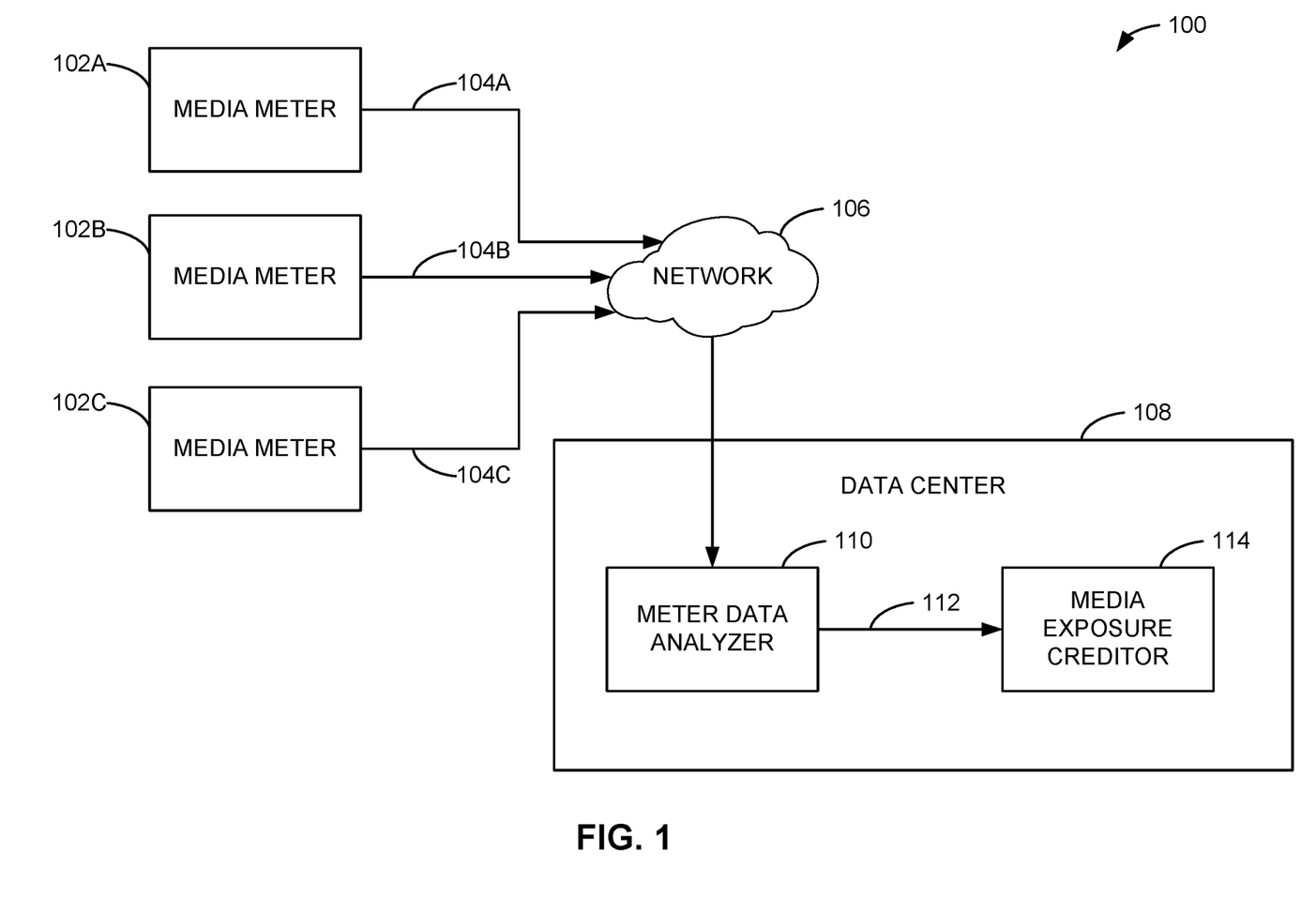
FIG. 1 is a block diagram of an example environment in which the teachings of this disclosure may be implemented.

FIG. 1 is a block diagram of an example environment 100 in which the teachings of this disclosure may be implemented. The example environment 100 includes an example first media meter 102A, an example second media meter 102B, and an example third media meter 102C, which output example first monitoring data 104A, example second monitoring data 104B, and example third monitoring data 104C, respectively, to an example network 106. The environment 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C may have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, 102C and generate the example monitoring data 104A, 104B, 104C. In some examples, monitoring data 104A, 104B, 104C generated by the media meters 102A, 102B, 102C can include watermarks detected in presented media. Such detected watermarks may be referred to as monitored media watermarks or monitored watermarks as they are detected in media monitored by the media meters 102A, 102B, 102C. In some examples, the media meters 102A, 102B, 102C can determine signatures associated with the presented media. For example, the media meters 102A, 102B, 102C can determine signatures (e.g., generate signatures, create signatures, etc.) representative of media presented on the associated media devices. Such signatures may be referred to as monitored media signatures or monitored signatures as they are determined from media monitored by the media meters 102A, 102B, 102C. Accordingly, the monitoring data 104A, 104B, 104C can include monitored media signatures and/or monitored media watermarks representative of the media monitored by the media meters 102A, 102B, 102C. In some examples, the monitoring data 104A, 104B, 104C is associated with a discrete, measurement time period (e.g., five minutes, ten minutes, etc.). In such example, the monitoring data 104A, 104B, 104C can include at sequences of monitored media signatures and/or sequences of monitored media watermarks associated media asset(s) (or portions thereof) presented by the media devices monitored by the media meters 102A, 102B, 102C.

Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

The example network 106 is a network used to transmit the monitoring data 104A, 104B, 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other suitable means of transmitting the monitoring data 104A, 104B, 104C to the data center 108 can be used.

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS®, etc.). In this example, the data center 108 can further store and process generated watermark and signature reference data.

The example meter data analyzer 110 processes the gathered media monitoring data to detect, identify, credit, etc., respective media assets and/or portions thereof (e.g., media segments) associated with the corresponding monitoring data 104A, 104B, 104C. For example, the meter data analyzer 110 can compare the monitoring data 104A, 104B, 104C to generated reference data to determine what respective media is associated with the corresponding monitoring data 104A, 104B, 104C. In some examples, the meter data analyzer 110 can hash the signatures included in the monitoring data 104A, 104B, 104C. In some examples, the meter data analyzer 110 can identify the media by matching unhashed signatures and/or hashed signatures. The meter data analyzer 110 of the illustrated example also analyzes the monitoring data 104A, 104B, 104C to determine if the media asset(s), and/or particular portion(s) (e.g., segment(s)) thereof, associated with the signature match is (are) to be credited. For example, the meter data analyzer 110 can compare monitored media signatures in the monitoring data 104A, 104B, 104C to a library of generated reference signatures to determine the media asset(s) associated with the monitored media signatures. In response to detecting a match between a sequence of the monitored media signatures and a corresponding sequence of the reference signatures, referred to herein as a signature match, the meter data analyzer 110 can determine a signature match duration (e.g., the time duration associated with the successive matches between the individual monitored media signatures and the corresponding individual reference signatures included in the signature match). In some examples, if the duration of the signature match is less than a duration threshold, the meter data analyzer 110 determines the timestamp of the signature match with reference to the matched reference media asset. That is, the meter data analyzer 110 can determine the time position within the matched reference media assets that is associated with the media segment represented by the signature match (e.g., where in the reference media asset the signature match occurred). In some examples, if the duration of the signature match is less than the duration threshold and occurs within a threshold time period (e.g., an offset threshold), the meter data analyzer 110 can determine whether to credit the segment of the monitored media presentation represented by the signature match as being associated with a lead-in bumper or other media segment shared among multiple media assets. For example, a signature match of a duration less than the duration threshold is representative of relatively short media segments that are shared among multiple media assets (e.g., title sequence, credit sequence, etc. of television episodes, movies, etc.). Similarly, a signature match that occurs within the offset threshold is representative of the position in the reference media asset the shared media segment typically occurs. For example, a media segment representing a shared title sequence of a television series occurs within an offset threshold from the start of the reference asset. Additionally or alternatively, a media segment representing a shared credit sequence of a television series occurs within an offset threshold from the end of the reference asset. An example implementation of the meter data analyzer 110 is described below in conjunction with FIG. 2.

The example identification data 112 includes information to credit user(s) associated with the media meters 102A, 102B, 102C with exposure to one or more particular media assets. For example, the identification data 112 can include direct associations between monitoring data 104A, 104B, 104C and one or more particular media assets. For example, the identification data 112 can include media identifiers associated with the media assets represented in the monitoring data 104A, 104B, 104C and timestamps associated with the period of exposure to that media. The example media exposure creditor 114 uses the identification data 112 to credit media with having been exposed to user(s). In some examples, the media exposure creditor 114 generates a report including data metrics that may be presented to media providers.

Figure 2:
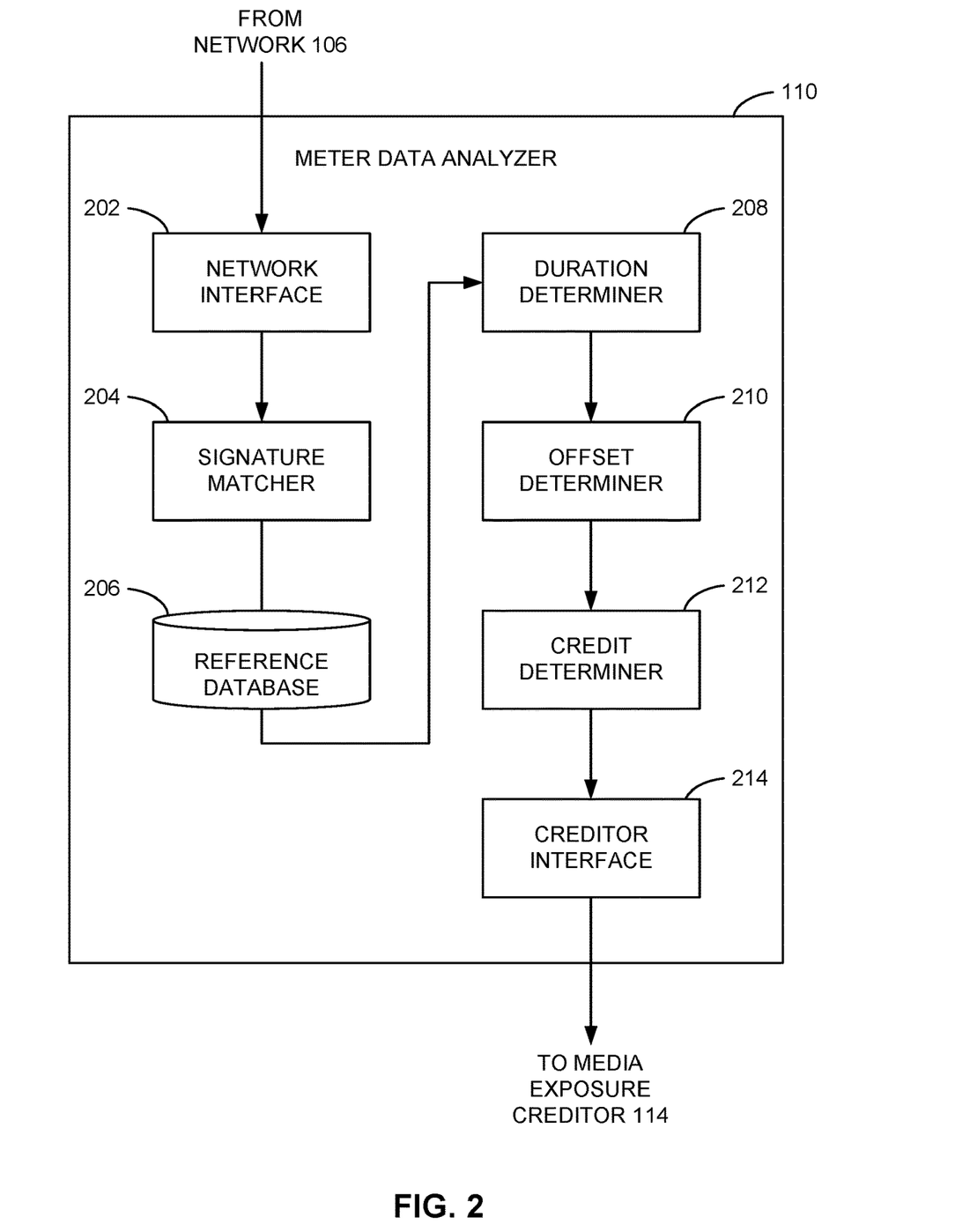
FIG. 2 is a block diagram of an example implementation of a meter data analyzer included in the example environment of FIG. 1.

FIG. 2 is a block diagram of an implementation of the meter data analyzer 110 of FIG. 1. In the illustrated example, the meter data analyzer 110 includes an example network interface 202, an example signature matcher 204, an example reference database 206, an example duration determiner 208, an example offset determiner 210, an example credit determiner 212, and an example creditor interface 214.

The example network interface 202 allows the meter data analyzer 110 to receive the monitoring data 104A, 104B, 104C from the example network 106. In some examples, the network interface 202 can convert the monitoring data 104A, 104B, 104C into a format readable by the meter data analyzer 110. In some examples, the network interface 202 can be in continuous communication with the network 106, the first media meter 102A, the second media meter 102B, and/or the third media meter 102C. In other examples, the network interface 202 can be in intermittent (e.g., periodic or aperiodic) communication with the network 106, the first media meter 102A, the second media meter 102B, and/or the third media meter 102C. In some examples, the network interface 202 can be absent. In such examples, the media meters 102A, 102B, 102C can be in direct communication with the meter data analyzer 110. For example, if the meter data analyzer 110 is implemented via a cloud service, some or all of the media meters 102A, 102B, 102C can directly upload the monitoring data 104A, 104B, 104C directly to the cloud service.

The example signature matcher 204 compares the monitored media signatures in the monitoring data 104A, 104B, 104C and the reference signatures in the example reference database 206 to identify signature matches. For example, the signature matcher 204 determines if a sequence of the monitored signatures in the monitoring data 104A, 104B, 104C matches a sequence of reference signatures stored in the reference database 206. In examples disclosed herein, the signature matcher 204 may perform matching using any suitable means (e.g., unhashed matching, hashed matching, etc.) and/or comparison criteria, such as those described above. In some examples, the signature matcher 204 outputs signature match results that include a reference identifier identifying the reference media asset represented by the matched reference signatures, a duration of the signature match corresponding to the length of the matched media segment in the matched reference media asset, and a timestamp corresponding to a position (e.g., starting position) of the matched media segment in the matched reference asset.

The example reference database 206 includes generated reference signatures created or otherwise obtained by the data center 108. In some examples, the reference database 206 includes reference unhashed signatures and/or referenced hashed signatures. In some examples, the media monitoring entity associated with the reference database 206 can directly monitor media source feeds to generate reference unhashed signatures and/or hashed signatures. In some examples, the media monitoring entity generates reference unhashed signatures and/or hashed signatures from downloaded media (e.g., SVOD assets), etc. In examples disclosed herein, reference signatures are generated using the same or similar techniques as the monitored media signatures, such that the monitored media signatures and reference signatures of the same asset match. In some examples, each reference signature stored in the reference database 206 is associated with a specific reference media asset, such as, but not limited to, episodes of television programs (e.g., episodes of Game of Thrones, The Office, etc.), movies of a movie collection (e.g., The Marvel Cinematic Universe, etc.), etc. In some examples, each reference signature stored in the reference database 206 is associated with a timestamp, which indicates a position in the reference media asset represented by the reference signature. In some examples, the reference database 206 can include a library (e.g., database, table, etc.) of reference hashed signatures.

The example duration determiner 208 determines a time duration of the signature match or, in other words, the signature match duration between a sequence of the monitored media signatures of the monitoring data 104A, 104B, 104C and a corresponding sequence of the reference signatures in the example reference database 206. For example, the duration determiner 208 can determine the signature match between a given sequence of monitored media signatures in the monitoring data 104A, 104B, 104C and the corresponding sequence of reference signature representative of a reference media asset covers the entire duration of the reference signatures associated with that reference media asset and, thus, the signature match covers the entire duration of the reference media asset. In some examples, the duration determiner 208 determines the time duration of the signature match based on timestamps associated with the first and last reference signatures of the signature match. For example, the timestamps associated with the first and last reference signatures of the signature match correspond to positions in the reference asset. Thus, the duration determiner 208 may determine the time duration of the signature match as the difference between the timestamp of the last signature match and the timestamp of the first signature match of the reference asset. In some examples, the duration determiner 208 determines the signature match between the sequence of monitored signatures of the monitoring data 104A, 104B, 104C and the corresponding sequence of reference signatures corresponds to a portion (e.g., a segment) of the reference asset.

The example offset determiner 210 determines the offset between a sequence of monitored media signatures in the monitoring data 104A, 104B, 104C and a corresponding matched sequence of reference signatures representative of a reference media asset. In some examples, the offset determiner 210 determines the offset based on the timestamps associated with the signature matches of the reference signatures stored in the reference database 206. For example, the offset determiner 210 determines the position of the signature match relative to the start of the reference media asset based on the corresponding timestamps of the first signature match and last signature match of the reference signatures. In some examples, the offset determiner 210 determines the signature match occurs in the first ten minutes of the reference asset. In some examples, the offset determiner 210 determines the signature match occurs relatively later in the reference asset (e.g., after 10 minutes from the start of the reference asset).

The example credit determiner 212 generates the identification data 112 based on the output of the duration determiner 208 and the offset determiner 210. For example, the credit determiner 212 generates identification data 112 including a general identifier of a class of media assets corresponding to the media segment match. That is, the general identifier represents the class of media assets (e.g., a television series, a movie category, etc.) associated with the media segment match. Thus, the identification data 112 includes a general identifier that credits the class of media assets. For example, if the duration determiner 208 determines the signature match is less than a duration threshold (e.g., three minutes, two minutes, etc.) and the offset determiner 210 determines the offset of the signature match of the media segment does not exceed an offset threshold (e.g., ten minutes from the start of the reference asset, eight minutes from the start of the reference asset, etc.), the credit determiner 212 generates identification data 112 indicating the monitoring data 104A, 104B, 104C corresponds to a class of media assets stored in the reference database 206. That is, the identification data 112 associates the media exposure to a class of media (e.g., a television series, a movie series, etc.). In some examples, the credit determiner 212 determines the signature match exceeds the offset threshold. Thus, the credit determiner 212 indicates signature coverage of the reference database 206 is not complete (e.g., a reference signature of the media exposure has not been generated and/or stored). The example creditor interface 214 transmits the identification data 112 to the media exposure creditor 114.

Figure 3:
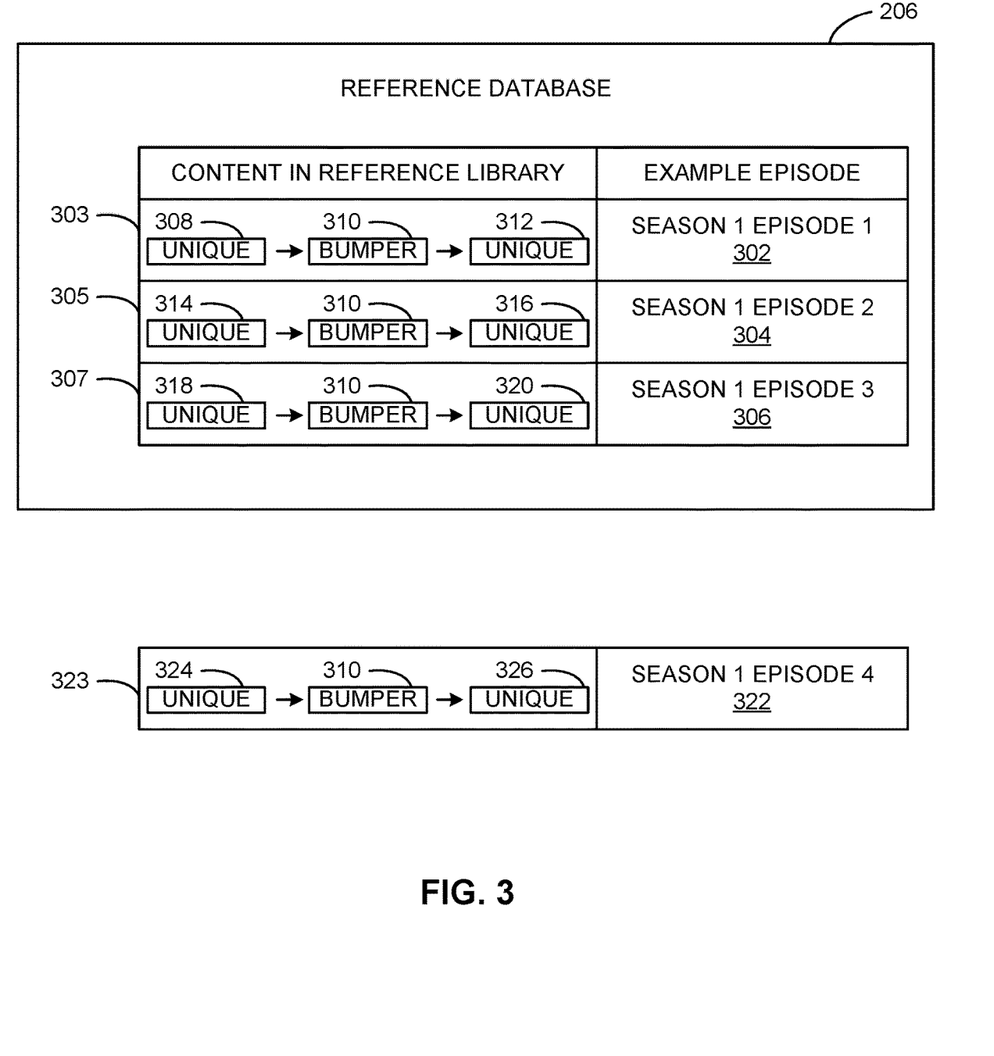
FIG. 3 is a block diagram of an example implementation of a reference database included in the example media data analyzer of FIG. 2.

FIG. 3 is a block diagram of an example implementation of the reference database 206 of FIG. 2. The reference database 206 of FIG. 3 includes entries corresponding to an example episode 302, an example episode 304, and an example episode 306. In some examples, the episodes 302, 304, 306 are episodes of the same television series (e.g., episodes of season 1 of a television series, etc.). In the illustrated example, the episode 302 is the first episode of a first television series, the episode 304 is the second episode of the first television series, and the episode 306 is the third episode of the first television series. The reference database 206 includes an example sequence of reference signatures 303 corresponding to the episode 302, an example sequence of reference signatures 305 corresponding to the episode 304, and an example sequence of reference signatures 307 corresponding to the episode 306. The sequence of reference signatures 303, 305, 307 each include three segments of signatures. However, the sequence of reference signatures 303, 305, 307 can additionally or alternatively include any number of signature segments. In the illustrated example of FIG. 3, the sequence of reference signatures 303 includes an example unique signature segment 308, an example bumper signature segment 310, and an example unique signature segment 312. The sequence of reference signatures 305 includes an example unique signature segment 314, the bumper signature segment 310, and an example unique signature segment 316. The sequence of reference signatures 307 includes an example unique signature segment 318, the bumper signature segment 310, and an example unique signature segment 320. In some examples, the unique signature segments 308, 314, 318 correspond to short signature segments (e.g., less than three minutes, less than five minutes, etc.) to introduce the episodes 302, 304, 306. In some examples, the unique signature segments 312, 316, 318 correspond to the main content of the episodes 302, 304, 306.

While the sequence of reference signatures 303, 305, 307 in the example of FIG. 3 are illustrated as including three segments of signatures (e.g., the unique signature segments 308, 314, 318, the bumper signature segment 310, the unique signature segments 312, 316, 320), the reference signatures may not be known to contain such segments. That is, the sequence of signatures 303, 305, 307 may not be divided and/or labeled as "unique" or "bumper" signature segments.

In the illustrated example of FIG. 3, the bumper signature segment 310 is a set of reference signatures corresponding to the shared lead-in bumper among multiple reference assets (e.g., the lead-in bumper of the episodes 302, 304, 306 of season 1). In the illustrated example of FIG. 3, the unique signature segments 308, 312, 314, 316, 318, 320 and the bumper signature segment 310 are the same duration (e.g., the same number of signatures). However, the unique signature segments 308, 312, 314, 316, 318, 320 and the bumper signature segment 310 can have any appropriate duration(s). For example, the signature segment 308 can be relatively shorter than the signature segment 314. In such an example, the bumper signature segment 310 of the sequence of reference signatures 303 has a shorter offset than the bumper signature segment 310 of the sequence of reference signatures 305 (e.g., the offset determiner 210 determines the position of the bumper signature segment 310 in the sequence of reference signatures 303 is relatively closer to the beginning of the reference asset than the bumper signature segment 310 in the sequence of reference signatures 305). Additionally or alternatively, the sequence of reference signatures 303, 305, 307 can have different respective durations (e.g., include different numbers of signatures).

The illustrated example of FIG. 3 further includes an example sequence of monitored media signatures 323 corresponding to the episode 322, which are not stored in the reference database 206. In some examples, the sequence of monitored media signatures 323 is included in the monitoring data 104A, 104B, 104C collected by the meters 102A, 102B, 102C. For example, the episode 322 may be newly released (e.g., the data center 108 has not generated and stored the reference signature of the episode 322). The episode 322 includes an example unique signature segment 324, the bumper signature segment 310, and an example unique signature segment 326. As described above, the sequence of monitored media signatures 323 does not include the labels "unique" and "bumper" as the fact that the signature segments 324 and 326 are unique and the signature segment 310 corresponds to the bumper signature segment may not be known. In some examples, the signature matcher 204 compares the sequence of monitored media signatures 323 to the sequence of signatures 303, 305, 307, and determines the bumper signature segment 310 of the sequence of monitored media signatures 323 matches the bumper signature segment 310 of the sequence of signatures 303, 305, 307. The offset determiner 210 determines the bumper signature 310 has a duration that is less than the duration threshold. In some examples, the offset determiner 210 determines the bumper signature segment 310 occurs within the offset threshold with respect to the start of the sequence of reference signatures 303, 305, 307. In some such examples, the credit determiner 212 credits the media exposure of the episode 322 to an identifier of the class of media assets corresponding to season 1 of the episodes 302, 304, 306. Furthermore, in some such examples, such as when the other segments 324 and 326 do not match reference signature segments (e.g., such as the segments 308, 312, 314, 316, 318 and/or 320) in the reference database 206, the credit determiner 212 credits the media exposure of the episode 322 to the identifier of the class of media assets corresponding to season 1 of the episodes 302, 304, 306, but not to a specific one of the episodes. That is, the credit determiner 212 credits the media exposure to the broader season (e.g., season 1) and not the specific episodes 302, 304, 306.

While an example manner of implementing the meter data analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example signature matcher 204, the example reference database 206, the example duration determiner 208, the example offset determiner 210, the example credit determiner 212, the example creditor interface 214 and/or, more generally, the example meter data analyzer 110 of FIG. 2 may be implemented by hardware, software, firmware and/or any combination of hardware, software and/or firmware. Thus, for example, any of the example network interface 202, the example signature matcher 204, the example reference database 206, the example duration determiner 208, the example offset determiner 210, the example credit determiner 212, the example creditor interface 214 and/or, more generally, the example meter data analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 202, the example signature matcher 204, the example reference database 206, the example duration determiner 208, the example offset determiner 210, the example credit determiner 212, the example creditor interface 214 and/or the example meter data analyzer 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
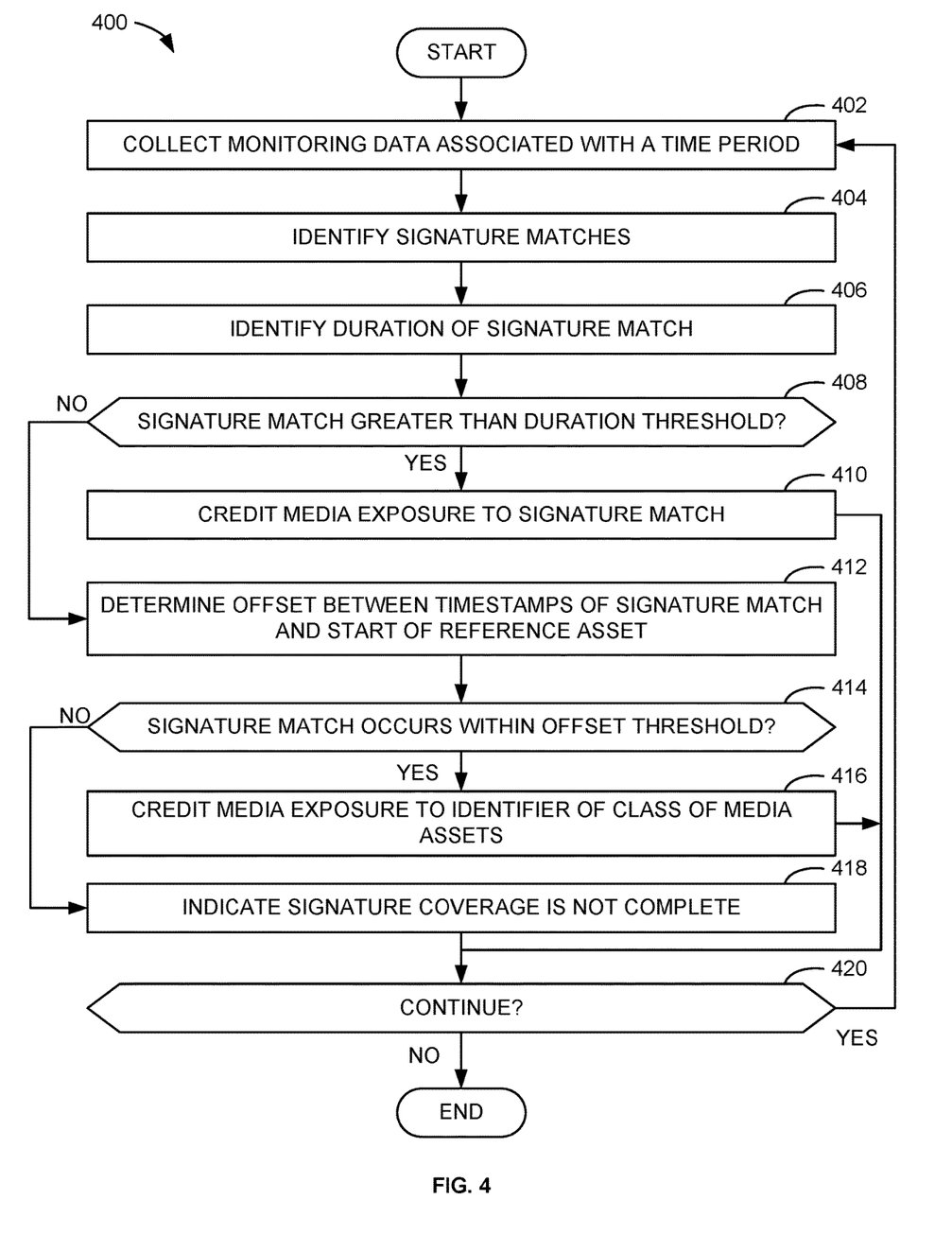
FIG. 4 is a flowchart representative of machine readable instructions which may be executed to implement the meter data analyzer of FIGS. 1 and/or 2.

A flowchart representative of example hardware logic, machine readable instructions, hardware implemented state machines, and/or any combination thereof for implementing the meter data analyzer 110 of FIG. 2 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example meter data analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 400 of FIG. 4 includes block 402. At block 402, the network interface 202 collects media meter data associated with a time period. For example, the network interface 202 allows the meter data analyzer 110 to receive monitoring data 104A, 104B, 104C from the example network 106. In some examples, the network interface 202 can convert the received monitoring data 104A, 104B, 104C into a format readable by the meter data analyzer 110.

At block 404, the signature matcher 204 identifies signature matches. For example, the signature matcher 204 compares the monitored media signatures in the monitoring data 104A, 104B, 104C to the reference signatures stored in the reference database 206. In some examples, the signature matcher 204 uses unhashed (e.g., linear) signature matching. In some examples, the signature matcher 204 uses hashed signature matching.

At block 406, the duration determiner 208 determines the duration of the signature match. For example, the duration determiner 208 determines the timestamps associated with the first and last reference signature of the signature match (e.g., the signature match determined at block 404) and determines the duration of the signature match based on the difference between the timestamps. At block 408, the duration determiner 208 determines whether the signature match duration is greater than the duration threshold. In some examples, the duration threshold is three minutes. Thus, the duration determiner 208 compares the signature match duration to the duration threshold.

If, at block 408, the duration determiner 208 determines the signature match duration exceeds the duration threshold, then at block 410, the credit determiner 212 credits the media exposure to the reference media asset associated with the reference signature match. For example, the duration determiner 208 determines the signature match duration covers the entire duration of the reference signatures (e.g., the signature match duration is greater than three minutes). Thus, the credit determiner 212 generates identification data 112 crediting the reference media asset corresponding to signature match.

If, at block 408, the duration determiner 208 determines the signature match duration does not exceed the duration threshold, then at block 412, the offset determiner 210 determines the offset between the timestamps of the signature match and the start of the corresponding reference media asset. For example, the offset determiner 210 determines the timestamps of the reference signatures corresponding to the start and end of the signature match. In some examples, the offset determiner 210 determines the signature match occurs within the first ten minutes of the reference asset).

At block 414, the offset determiner 210 determines whether the signature match occur within the offset threshold. In some examples, the offset threshold is ten minutes (e.g., the first ten minutes from the start of the reference asset). For example, the offset determiner 210 determines whether the first and last timestamps of the reference signatures corresponding to the signature match occur within the first ten minutes of the reference asset.

If, at block 414, the offset determiner 210 determines the signature match occurs within the offset threshold, then at block 416, the credit determiner 212 credits the media exposure associated with the signature match to the identifier of the class of media assets. That is, at block 414, the credit determiner 212 credits the media exposure to the class of media assets (e.g., a television series, etc.) associated with the signature match between the signatures of the monitoring data 104A, 104B, 104C and the reference signatures. In some examples, the credit determiner 212 generates identification data 112 crediting the identifier of the class of media assets. For example, the identifier of the class of media assets can correspond to a media category (e.g., television series type, movie series type, etc.) of the signature matches. For example, the credit determiner 212 credits the identifier of the television series associated with the signature match (e.g., individual episodes of the television series are not credited). In some examples, at block 414, the credit determiner 212 additionally or alternatively credits the media exposure associated with the signature match to a lead-in bumper (or other shared media segment) associated with that class of media assets.

If, at block 414, the offset determiner 210 determines the signature match does not occur within the offset threshold, then at block 418, the credit determiner 212 indicates signature coverage is not complete. That is, the credit determiner 212 determines the media exposure does not match a single reference asset (e.g., a television episode, a movie, etc.) or a class of media assets (e.g., a television series, etc.). For example, the credit determiner 212 may generate identification data 112 that does not credit any signatures stored in the reference database 206.

At block 420, the meter data analyzer 110 determines whether to continue generating and/or analyzing signatures.

If, at block 420, the meter data analyzer 110 determines to continue generating and/or analyzing signatures, the program 400 returns to block 402. Otherwise, the program 400 ends.

Figure 5:
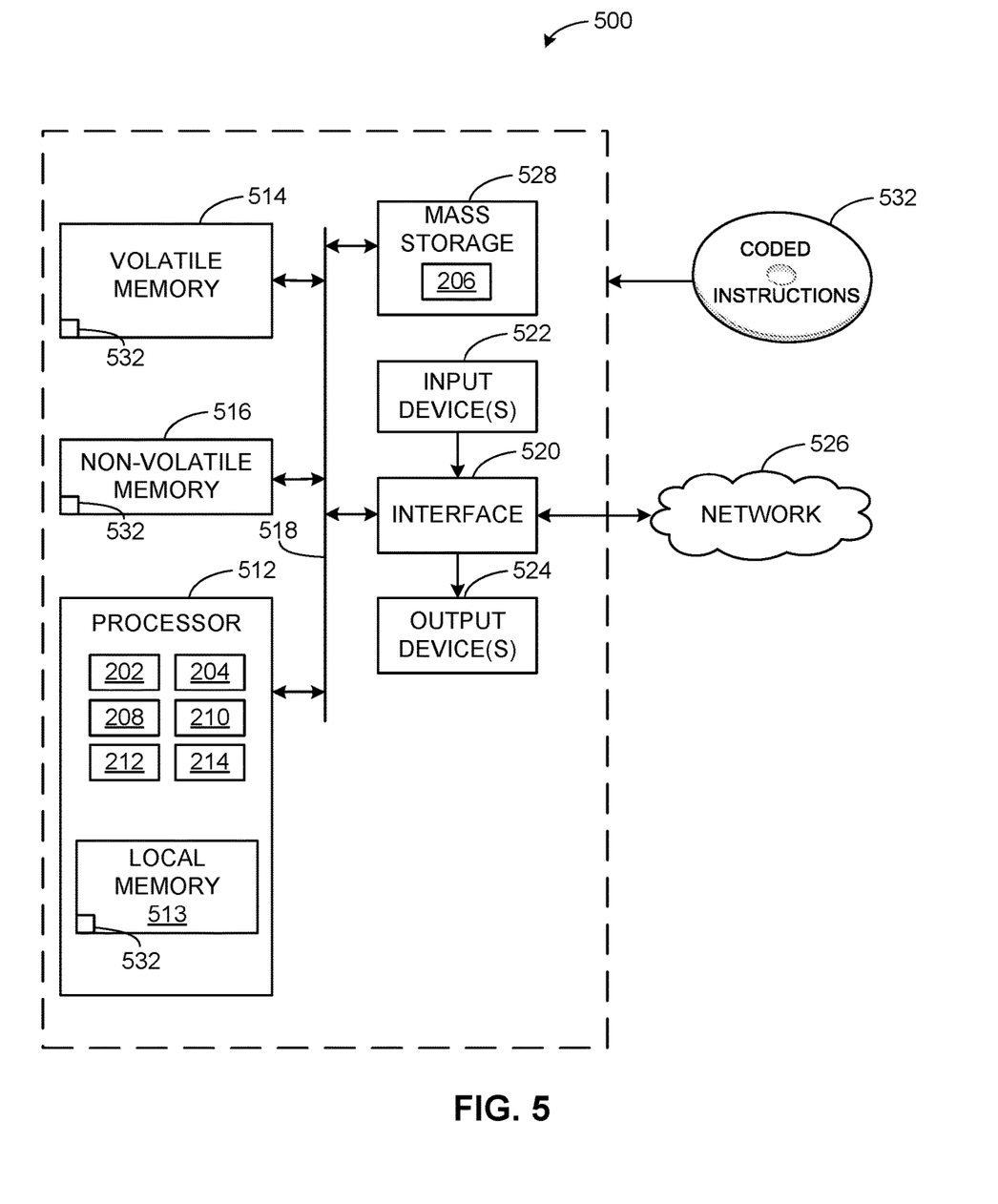
FIG. 5 is a block diagram of an example processing platform structured to execute the instructions of FIG. 4 to implement the meter data analyzer of FIGS. 1 and/or 2.

FIG. 5 is a block diagram of an example processor platform 500 structured to execute the instructions of FIG. 4 to implement the meter data analyzer 110 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example signature matcher 204, the example reference database 206, the example duration determiner 208, the example offset determiner 210, the example credit determiner 212, the example creditor interface 214.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that allow for reference signature matching. Example disclosed methods, apparatus and articles of manufacture improve the efficiency of using a computing device by reducing computational and storage requirements of systems that identify media using signatures. For example, disclosed examples prevent incorrect crediting and storage of partially matching signatures, which enables broader, more accurate crediting of media. The disclosed methods, apparatus and articles of manufacture are accordingly directed to one or more improvement(s) in the functioning of a computer.

Example methods, apparatus, systems, and articles of manufacture to credit media segments shared among multiple assets are disclosed herein. Further examples and combinations thereof include the following:

Example 1 includes an apparatus comprising a signature matcher to compare a sequence of monitored media signatures with a library of reference signatures to determine a signature match, the sequence of monitored media signatures representative of a monitored media presentation, a duration determiner to determine a duration of the signature match, an offset determiner to determine an offset of the signature match, the offset to represent a position of the signature match relative to a start of a reference media asset associated with the signature match, and a credit determiner to credit a segment of the monitored media presentation represented by the signature match to an identifier of a class of media assets including the reference media asset in response to a determination that (i) the duration of the signature match does not exceed a first threshold and (ii) the offset does not exceed a second threshold.

Example 2 includes the apparatus of example 1, wherein the credit determiner is to credit the monitored media presentation as corresponding to the reference media asset in response to the duration of the signature match exceeding the first threshold.

Example 3 includes the apparatus of example 1, wherein the credit determiner is to indicate signature coverage is not complete and not credit the identifier of the media asset in response to (i) the duration of the signature match not exceeding the first threshold and (ii) the offset exceeding the second threshold.

Example 4 includes the apparatus of example 1, wherein the reference media asset is a first media asset, and the class of media assets includes the first media asset and a second media asset.

Example 5 includes the apparatus of example 1, wherein the duration determiner is to determine the duration of the signature match based on a difference between a first timestamp of the reference asset and a second timestamp of the reference asset, the first timestamp corresponding to a first signature of the signature match and the second timestamp corresponding to a last signature of the signature match.

Example 6 includes the apparatus of example 1, wherein the media presentation is presented by a media device, and the sequence of monitored media signatures is included in monitoring data obtained from a meter that is to monitor the media device.

Example 7 includes the apparatus of example 1, wherein the first threshold is three minutes and the second threshold is ten minutes.

Example 8 includes a method comprising comparing, by executing an instruction with a processor, a sequence of monitored media signatures with a library of reference signatures to determine a signature match, the sequence of monitored media signatures representative of a monitored media presentation, determining, by executing an instruction with the processor, a duration of the signature match, determining, by executing an instruction with the processor, an offset of the signature match, the offset to represent a position of the signature match relative to a start of a reference media asset associated with the signature match, and crediting, by executing an instruction with the processor, a segment of the monitored media presentation represented by the signature match to an identifier of a class of media assets including the reference media asset in response to a determination that (i) the duration of the signature match does not exceed a first threshold and (ii) the offset does not exceed a second threshold.

Example 9 includes the method of example 8, further including crediting the monitored media presentation as corresponding to the reference media asset in response to the duration of the signature match exceeding the first threshold.

Example 10 includes the method of example 8, further including indicating signature coverage is not complete and not crediting the identifier of the media asset in response to (i) the duration of the signature match not exceeding the first threshold and (ii) the offset exceeding the second threshold.

Example 11 includes the method of example 8, wherein the reference media asset is a first media asset, and the class of media assets include the first media asset and a second media asset.

Example 12 includes the method of example 8, further including determining the duration of the signature match based on a difference between a first timestamp of the reference asset and a second timestamp of the reference asset, the first timestamp corresponding to a first signature of the signature match and the second timestamp corresponding to a last signature of the signature match.

Example 13 includes the method of example 8, wherein the media presentation is presented by a media device, and the sequence of monitored media signatures is included in monitoring data obtained from a meter that is to monitor the media device.

Example 14 includes the method of example 8, wherein the first threshold is three minutes and the second threshold is ten minutes.

Example 15 includes a non-transitory computer readable medium comprising instructions which, when executed, cause a machine to at least compare a sequence of monitored media signatures with a library of reference signatures to determine a signature match, the sequence of monitored media signatures representative of a monitored media presentation, determine a duration of the signature match, determine an offset of the signature match, the offset to represent a position of the signature match relative to a start of a reference media asset associated with the signature match, and credit a segment of the monitored media presentation represented by the signature match to an identifier of a class of media assets including the reference media asset in response to a determination that (i) the duration of the signature match does not exceed a first threshold and (ii) the offset does not exceed a second threshold.

Example 16 includes the non-transitory computer readable medium of example 15, wherein the instructions cause the machine to credit the monitored media presentation as corresponding to the reference media asset in response to the duration of the signature match exceeding the first threshold.

Example 17 includes the non-transitory computer readable medium of example 15, wherein the instructions cause the machine to indicate signature coverage is not complete and not credit the identifier of the media asset in response to (i) the duration of the signature match not exceeding the first threshold and (ii) the offset exceeding the second threshold.

Example 18 includes the non-transitory computer readable medium of example 15, wherein the reference media asset is a first media asset, and the class of media assets includes the first media asset and a second media asset.

Example 19 includes the non-transitory computer readable medium of example 15, wherein the instructions cause the machine further to determine the duration of the signature match based on a difference between a first timestamp of the reference asset and a second timestamp of the reference asset, the first timestamp corresponding to a first signature of the signature match and the second timestamp corresponding to a last signature of the signature match.

Example 20 includes the non-transitory computer readable medium of example 15, wherein the media presentation is presented by a media device, and the sequence of monitored media signatures representative is included in monitoring data obtained from a meter that is to monitor the media device.

Example 21 includes the non-transitory computer readable medium of example 15, wherein the first threshold is three minutes and the second threshold is ten minutes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
instructions; and
processor circuitry to execute the instructions to:
compare a sequence of monitored media signatures with a library of reference signatures to determine a signature match, the sequence of monitored media signatures representative of a monitored media presentation;
determine a duration of the signature match based on a difference between a first timestamp associated with a first reference signature of the signature match and a second timestamp associated with a last reference signature of the signature match;
determine an offset of the signature match, the offset to represent a position of the signature match relative to a start of a reference media asset associated with the signature match, the reference media asset corresponding to an individual television program of a television series; and
credit a segment of the monitored media presentation represented by the signature match to a lead-in bumper associated with the television series but not credit the segment of the monitored media presentation to the individual television program of the television series in response to the duration of the signature match being less than a first threshold and the offset being less than a second threshold.

2. The apparatus of claim 1, wherein the processor circuitry is to credit the monitored media presentation as corresponding to the individual television program in response to the duration of the signature match exceeding the first threshold.

3. The apparatus of claim 1, wherein the processor circuitry is to indicate signature coverage is not complete and not credit an identifier of the television series in response to (i) the duration of the signature match not exceeding the first threshold and (ii) the offset exceeding the second threshold.

4. The apparatus of claim 1, wherein the individual television program is a first individual television program, and the television series includes the first individual television program and a second individual television program.

5. The apparatus of claim 1, wherein the monitored media presentation is presented by a media device, and the sequence of monitored media signatures is included in monitoring data obtained from a meter that is to monitor the media device.

6. The apparatus of claim 1, wherein the first threshold is three minutes and the second threshold is ten minutes.

7. A method comprising:
comparing, by executing an instruction with a processor, a sequence of monitored media signatures with a library of reference signatures to determine a signature match, the sequence of monitored media signatures representative of a monitored media presentation;
determining, by executing an instruction with the processor, a duration of the signature match based on a difference between a first timestamp associated with a first reference signature of the signature match and a second timestamp associated with a last reference signature of the signature match;
determining, by executing an instruction with the processor, an offset of the signature match, the offset to represent a position of the signature match relative to a start of a reference media asset associated with the signature match, the reference media asset corresponding to an individual television program of a television series; and
crediting, by executing an instruction with the processor, a segment of the monitored media presentation represented by the signature match to a lead-in bumper associated with the television series but not credit the segment of the monitored media presentation to the individual television program of the television series in response to the duration of the signature match being less than a first threshold and the offset being less than a second threshold.

8. The method of claim 7, further including crediting the monitored media presentation as corresponding to the individual television program in response to the duration of the signature match exceeding the first threshold.

9. The method of claim 7, further including indicating signature coverage is not complete and not crediting an identifier of the television series in response to (i) the duration of the signature match not exceeding the first threshold and (ii) the offset exceeding the second threshold.

10. The method of claim 7, wherein the individual television program is a first individual television program, and the television series includes the first individual television program and a second individual television program.

11. The method of claim 7, wherein the monitored media presentation is presented by a media device, and the sequence of monitored media signatures is included in monitoring data obtained from a meter that is to monitor the media device.

12. A non-transitory computer readable medium comprising instructions which, when executed, cause a machine to at least:
compare a sequence of monitored media signatures with a library of reference signatures to determine a signature match, the sequence of monitored media signatures representative of a monitored media presentation;
determine a duration of the signature match based on a difference between a first timestamp associated with a first reference signature of the signature match and a second timestamp associated with a last reference signature of the signature match;
determine an offset of the signature match, the offset to represent a position of the signature match relative to a start of a reference media asset associated with the signature match, the reference media asset corresponding to an individual television program of a television series; and
credit a segment of the monitored media presentation represented by the signature match to a lead-in bumper associated with the television series but not credit the segment of the monitored media presentation to the individual television program of the television series in response to the duration of the signature match being less than a first threshold and the offset being less than a second threshold.

13. The non-transitory computer readable medium of claim 12, wherein the instructions cause the machine to credit the monitored media presentation as corresponding to the individual television program in response to the duration of the signature match exceeding the first threshold.

14. The non-transitory computer readable medium of claim 12, wherein the instructions cause the machine to indicate signature coverage is not complete and not credit an identifier of the television series in response to (i) the duration of the signature match not exceeding the first threshold and (ii) the offset exceeding the second threshold.

15. The non-transitory computer readable medium of claim 12, wherein the individual television program is a first individual television program, and the television series includes the first individual television program and a second television program.

16. The non-transitory computer readable medium of claim 12, wherein the monitored media presentation is presented by a media device, and the sequence of monitored media signatures representative is included in monitoring data obtained from a meter that is to monitor the media device.

17. The non-transitory computer readable medium of claim 12, wherein the first threshold is three minutes and the second threshold is ten minutes.

* * * * *